(12) United States Patent
Song

(10) Patent No.: US 8,763,591 B2
(45) Date of Patent: Jul. 1, 2014

(54) FUEL HEATING EQUIPMENT OF DIESEL ENGINE

(76) Inventor: Seok Ju Song, Cheongju (KR)

( * ) Notice: Subject to any disclaimer, the term of this patent is extended or adjusted under 35 U.S.C. 154(b) by 284 days.

(21) Appl. No.: 12/810,018

(22) PCT Filed: Dec. 17, 2008

(86) PCT No.: PCT/KR2008/007464
§ 371 (c)(1),
(2), (4) Date: Jun. 21, 2010

(87) PCT Pub. No.: WO2009/082118
PCT Pub. Date: Jul. 2, 2009

(65) Prior Publication Data
US 2010/0275889 A1    Nov. 4, 2010

(30) Foreign Application Priority Data

Dec. 21, 2007  (KR) ........................ 10-2007-0135106
May 26, 2008  (KR) ........................ 10-2008-0049389

(51) Int. Cl.
*F02G 5/00*    (2006.01)
(52) U.S. Cl.
USPC ............ 123/557; 123/547; 123/543; 123/546
(58) Field of Classification Search
USPC .................................. 123/557, 547, 543, 546
See application file for complete search history.

(56) References Cited

U.S. PATENT DOCUMENTS

| | | | | |
|---|---|---|---|---|
| 3,133,527 | A | * | 5/1964 | Mizer ........................ 122/136 R |
| 3,793,992 | A | * | 2/1974 | Marquez ..................... 122/20 B |
| 4,015,567 | A | * | 4/1977 | Zabenskie ...................... 123/557 |
| 4,458,642 | A | * | 7/1984 | Okubo et al. ............ 123/196 AB |
| 4,520,305 | A | * | 5/1985 | Cauchy .......................... 322/2 R |
| 4,562,820 | A | * | 1/1986 | Jiminez .......................... 123/557 |
| 4,612,896 | A | * | 9/1986 | Leibrand, Sr. ................. 123/557 |

(Continued)

FOREIGN PATENT DOCUMENTS

| | | |
|---|---|---|
| JP | 57-210153 | 12/1982 |
| JP | 58-018544 | 2/1983 |

(Continued)

OTHER PUBLICATIONS

International Search Report for PCT/KR2008/007464.

*Primary Examiner* — Marguerite McMahon
*Assistant Examiner* — James Kim
(74) *Attorney, Agent, or Firm* — AKC Patents LLC; Aliki K. Collins

(57) ABSTRACT

Disclosed is a fuel heating equipment of a diesel engine for preheating and heating fuel to supply the fuel to the engine. The fuel heating equipment of the diesel engine includes a main heating part having a collective tank, which is formed between runners connected to a first side of the engine and an exhaust pipe, and is heated by exhaust heat introduced from the runner, and a fuel supply pipe, which extends from a fuel tank and is wound around the collective tank to heat fuel, which passes through the fuel supply pipe due to heat conducted from the collective tank, so as to supply the fuel to the engine. The fuel heating equipment of the diesel engine further includes a preheating part provided such that the fuel supply pipe is inserted along the exhaust pipe to prevent the fuel, which is cooled by cold outside air in the winter season, from being directly introduced to the collective tank.

1 Claim, 3 Drawing Sheets

(56) References Cited

U.S. PATENT DOCUMENTS

| | | | |
|---|---|---|---|
| 4,703,741 A * | 11/1987 | Curran et al. | 123/557 |
| 4,862,836 A * | 9/1989 | Chen et al. | 123/3 |
| 4,883,616 A * | 11/1989 | Covey, Jr. | 261/64.4 |
| 4,909,192 A * | 3/1990 | Forster et al. | 123/25 C |
| 4,913,338 A * | 4/1990 | Hennuy et al. | 228/173.1 |
| 5,027,783 A * | 7/1991 | von Riesen | 123/572 |
| 5,327,875 A * | 7/1994 | Hall | 123/545 |
| 5,396,866 A * | 3/1995 | Kuntz | 123/25 B |
| 6,653,517 B2 * | 11/2003 | Bullock | 585/241 |
| 7,131,422 B2 * | 11/2006 | Kimura et al. | 123/198 E |
| 7,322,404 B2 * | 1/2008 | Van Decker et al. | 165/156 |
| 7,523,607 B2 * | 4/2009 | Sullivan | 60/320 |
| 7,756,404 B2 * | 7/2010 | Schubert et al. | 392/478 |
| 2002/0179292 A1 * | 12/2002 | Zhu et al. | 165/156 |
| 2005/0193726 A1 * | 9/2005 | Funakoshi | 60/323 |

FOREIGN PATENT DOCUMENTS

| | | |
|---|---|---|
| JP | 59-67569 U | 5/1984 |
| JP | 60-027771 | 2/1985 |
| JP | 02-005752 | 1/1990 |
| JP | 2-5752 A | 1/1990 |
| JP | 2001-227888 A | 8/2001 |
| KR | 20-1994-0027030 | 12/1994 |
| KR | 1996-0001875 Y1 | 2/1996 |
| KR | 20-0209722 | 10/2000 |
| KR | 20-0209722 Y1 | 1/2001 |

* cited by examiner

FUEL HEATING EQUIPMENT OF DIESEL ENGINE

RELATED APPLICATIONS

This application is a 371 application of International Application No. PCT/KR2008/007464, filed Dec. 17, 2008, which in turn claims priority from Korean Patent Application Nos. 10-2008-0049389 filed May 26, 2008, and 10-2007-0135106 filed Dec. 21, 2007, both of which are incorporated herein by reference in their entireties.

TECHNICAL FIELD

The present invention relates to a fuel heating equipment of a diesel engine, which preheats or heats fuel to supply the fuel to the diesel engine. More particularly, the present invention relates to a fuel heating equipment of a diesel engine, in which a collective tank is provided between runners connected to exhaust ports and an exhaust pipe, and a fuel supply pipe is wound around the collective tank such that fuel heated at the high temperature is supplied to the engine, thereby inducing complete combustion of fuel, enhancing the engine efficiency, and preventing environmental pollution by shutting off sooty smoke.

BACKGROUND ART

In general, a diesel engine is operated using fuel such as heavy oil, light oil, etc., which are cheaper than fuel used in a gasoline engine, and reduces fuel consumption, so that the diesel engine has an advantage of low operational cost. In addition, the diesel engine can be easily operated, so the diesel engine is widely used as an internal combustion engine.

A large-sized diesel engine is used as a main engine of a large-sized ship, a middle-sized diesel engine is used for a power generator and a ship, and a small-sized diesel engine is used for a vehicle, a rail road car, a small-sized ship, a construction equipment, etc. That is, the diesel engine is extensively used in various fields. In addition, the diesel engine is used for a cultivator, a pump spray for irrigation work in agriculture, a compressor, a power water pump, and emergency communication power.

As widely known to the public, the diesel engine using light oil as fuel produces sooty smoke upon incomplete combustion. Especially, in the case of the vehicle, when the vehicle runs along a hill or a driver strongly steps on an accelerating pedal, the sooty smoke is excessively produced. In addition, as described above, if the sooty smoke is excessively produced, the output of the vehicle is remarkably lowered and the emitted sooty smoke causes serious environmental pollution.

In order to overcome the above problems, various methods for heating and preheating fuel have been developed. For instance, in the case of a small-sized vehicle, a heating member or a typical burner is mounted on an outer part of the a fuel supply pipe, which is used to supply fuel contained in a fuel tank to the engine, thereby heating and preheating fuel to supply the fuel to the engine. In the case of a large-sized vehicle, the fuel supply is electronically controlled to prevent sooty smoke.

DISCLOSURE OF INVENTION

Technical Problem

However, when the fuel supply pipe is heated by a conventional burner, which is currently used, in the case of the large-sized vehicle, a great amount of fuel must be simultaneously supplied. However, in this case, additional fuel dedicated for heating the fuel must be prepared to simultaneously heat the great amount of fuel, so the fuel cost is increased due to the fuel prepared for heating the fuel in addition the fuel used to operate the engine, causing a difficulty in applying the above method to the large-sized vehicle.

In addition, an electronic fuel supply adjustment device used in the large-sized vehicle has a remarkable effect of reducing the sooty smoke, but has a problem in that the high cost is required to newly design and manufacture an electronic fuel supply adjustment device suitable for the small-sized vehicle and high cost is required to install the electronic fuel supply adjustment device in the small-sized vehicle.

In addition, in the electronic fuel supply adjustment device, the fuel is used without being heated, so fuel efficiency is lowered.

Meanwhile, the heating burner scheme and electronic fuel supply adjustment device may malfunction in use.

Technical Solution

The present invention has been made to solve the above problem occurring in the prior art, and an object of the present invention is to provide a fuel heating equipment for a diesel engine, in which a collective tank is provided between a runner connected to a corresponding exhaust port and an exhaust pipe and a fuel supply pipe is wound around an outer surface of the collective tank such that fuel heated at the high temperature is supplied to the engine, thereby inducing complete combustion of fuel, enhancing the engine efficiency, and preventing environmental pollution by shutting off sooty smoke.

Advantageous Effects

According to the present invention, a collective tank is provided between runners receiving exhaust heat from an engine and an exhaust pipe in order to collect the exhaust heat, and a fuel supply pipe is wound around the collective tank such that fuel can be heated upon the start of the engine. In addition, heated fuel can be supplied to the engine to induce complete combustion of fuel and enhance the efficiency of the engine, thereby reducing the fuel cost. Further, sooty smoke can be shut off, so that environmental pollution can be prevented.

In addition, the fuel heating equipment of the diesel engine according to the present invention can be easily manufactured, so the manufacturing cost can be reduced. Further, the fuel heating equipment can be applicable for various types of vehicles regardless of the size of the vehicle and can be applicable for diesel locomotives, small-sized ships and large-sized ships.

In addition, the fuel heating equipment is free from malfunction.

BEST MODE FOR CARRYING OUT THE INVENTION

Hereinafter, a fuel heating equipment of a diesel engine according to a preferred embodiment of the present invention will be described with reference to accompanying drawings.

Figure 1:
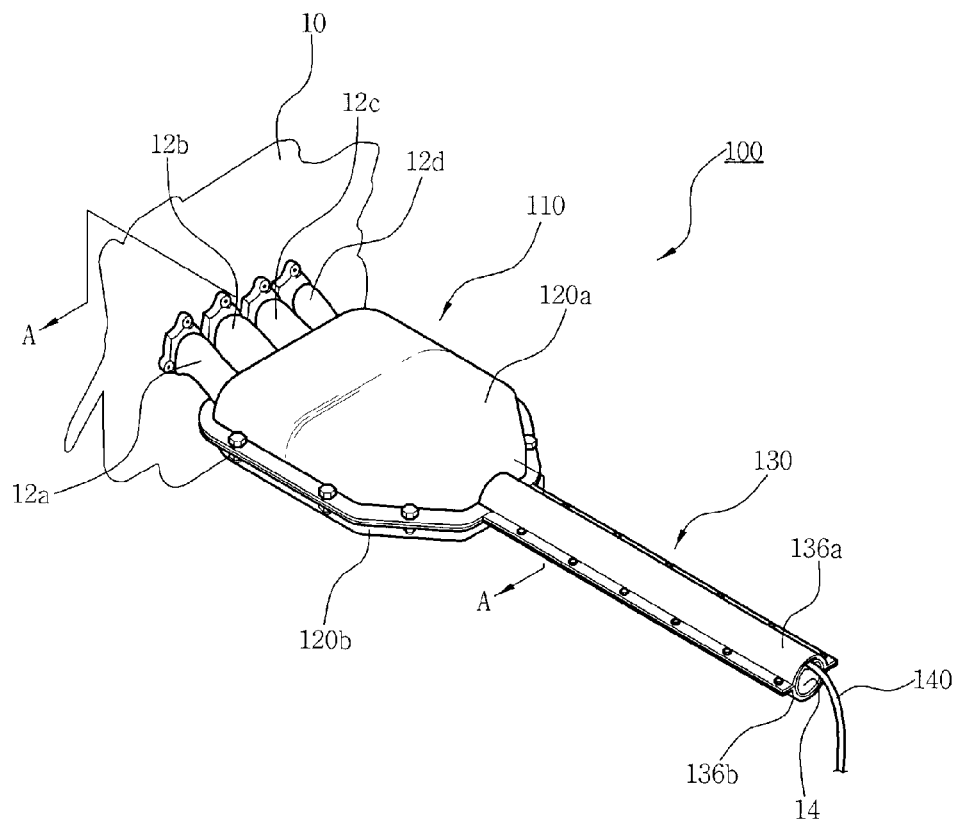
FIG. 1 is a perspective view showing a fuel heating equipment of a diesel engine according to the present invention.
Figure 2:
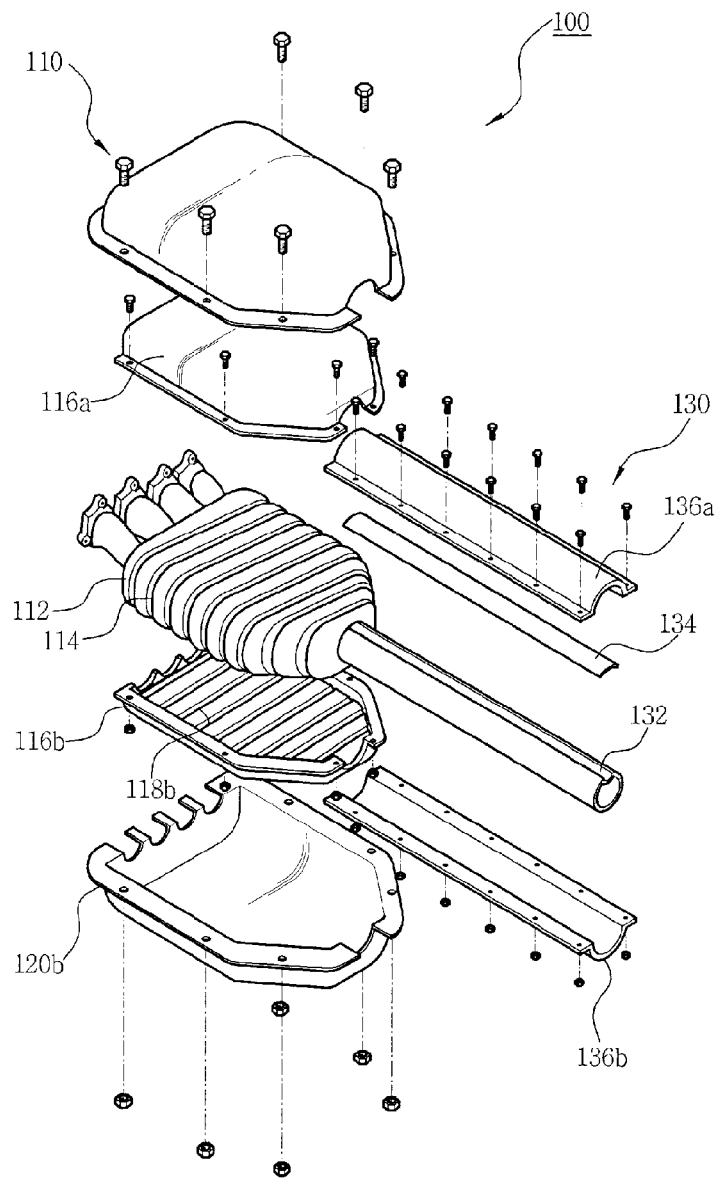
FIG. 2 is an exploded perspective view showing the fuel heating equipment of a diesel engine shown in FIG. 1.

FIG. 1 is a perspective view showing a fuel heating equipment of a diesel engine according to the present invention, and FIG. 2 is an exploded perspective view showing the fuel heating equipment of a diesel engine shown in FIG. 1.

As shown in FIGS. 1 and 2, a fuel heating equipment 100 of a diesel engine according to the present invention includes a main heating part 110 disposed between an engine 10 and an exhaust pipe 14, a preheating part 130 formed on the exhaust pipe 14, and a fuel supply pipe 140 which passes through the preheating part 130 and the main heating part 110 to supply fuel to the engine 10.

The main heating part 110 includes a collective tank 112 disposed between first, second, third and fourth runners 12a, 12b, 12c and 12d and the exhaust pipe 14. The first to fourth runners 12a to 12d are connected to first, second, third and fourth exhaust ports (not shown), respectively, which are formed at a first side of the engine 10. That is, the collective tank 112 has a first end connected to the first to fourth runners 12a to 12d and a second end connected to the exhaust pipe 14 extending toward the engine 10. As generally known in the art, the first to fourth runners 12a to 12d, the collective tank 112 and the exhaust pipe 14 constitute an exhaust manifold in cooperation with each other.

The fuel supply pipe 140 is wound around the collective tank 112. In order to maximize the contact area between the fuel supply pipe 140 and the collective tank 112, a heating groove 114 having a spiral shape is formed in an outer surface of the collective tank 112 from the second end of the collective tank 12 adjacent to the exhaust pipe 14 to the engine 10. That is, the fuel supply pipe 140 is wound around the collective tank 112 along the heating groove 114 in the spiral shape.

Figure 3:
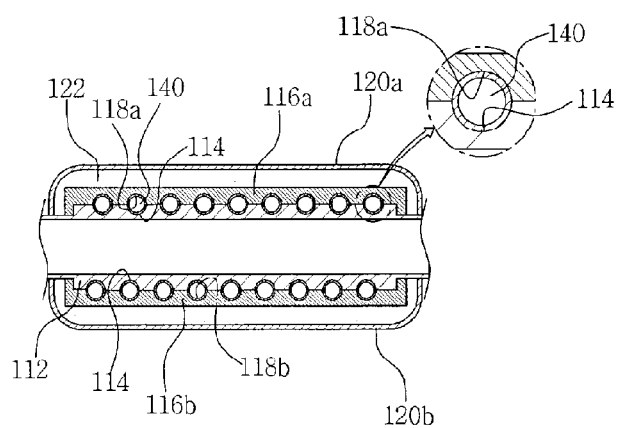
FIG. 3 is a sectional view taken along line A-A of FIG. 1.

FIG. 3 is a sectional view taken along line A-A of FIG. 1.

As shown in FIGS. 2 and 3, the main heating part 110 further includes a first heat conduction block 116a, a second heat conduction block 116b, a first heat insulation cover 120a and a second heat insulation cover 120b. The first and second heat conduction blocks 116a and 116b introduce high-temperature heat of the collective tank 12 into the fuel supply pipe 140 exposed out of the heating groove 114. The first and second heat insulation covers 120a and 120b define the collective tank 112, the fuel supply pipe 140 wound around the collective tank 112, the first heat conduction block 116a and the second heat conduction block 116b therein, and protect the collective tank 112, the fuel supply pipe 140 wound around the collective tank 112, the first heat conduction block 116a and the second heat conduction block 116b from cold outside environment.

The first heat conduction block 116a and the second heat conduction block 116b preferably include material having high conductivity. The first heat conduction block 116a adheres to an upper part of the collective tank 112 and side surfaces of the collective tank 112 adjacent to the upper part. The second heat conduction block 116b adheres to a lower part of the collective tank 112 and side surfaces of the collective tank 112 adjacent to the lower part. The first heat conduction block 116a and the second heat conduction block 116b adhere to the upper part and the lower part of the collective tank 112, respectively, without interfering with each other, and are coupled to each other through a bolt and a nut. Such first heat conduction block 116a and second heat conduction block 116b are formed therein with a first heat conduction groove 118a and a second heat conduction groove 118b, into which the fuel supply pipe 140 exposed out of the heating groove 114 is inserted. Meanwhile, the first heat insulation cover 120a covers the upper part of the collective tank 112, around which the fuel supply pipe 140 is wound and to which the first heat conduction block 116a adheres, and the side surfaces of the collective tank 112 adjacent to the upper part. Similarly, the second heat insulation cover 120b covers the lower part of the collective tank 112, around which the fuel supply pipe 140 is wound and to which the second heat conduction block 116b adheres, and the side surfaces of the collective tank 112 adjacent to the lower part. The first heat insulation cover 120a is coupled to the second heat insulation cover 120b through a bolt and a nut.

Preferably, an adiabatic member 122 is filled between the first heat conduction block 116a and the first heat insulation cover 120a, and between the second heat conduction block 116b and the second heat insulation cover 120b. The adiabatic member 122 includes rock wool.

Referring again to FIG. 1, the preheating part 130 is formed along the exhaust pipe 14, and such a preheating part 130 has a preheating groove 132 which is formed along the exhaust pipe 14 and into which the fuel supply pipe 140 is inserted. The preheating groove 132 is formed by compressing the exhaust pipe 14.

In addition, the preheating part 130 further includes an adiabatic cover 134, which covers an upper part of the preheating groove 132 while defining the fuel supply pipe 140 inserted into the preheating groove 132 therein, a first preheating cover 136a and a second preheating cover 136b, which have a semi-cylindrical shape and protect the fuel supply pipe 140 inserted into the preheating groove 132 from cold outside environment. The first preheating cover 136a and the second preheating cover 136b are coupled to each other through a bolt and a nut.

Figure 4:
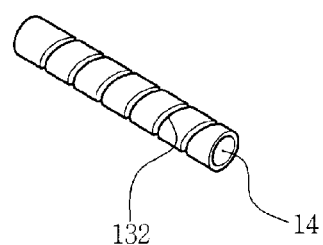
FIG. 4 is a view showing a preheating part according to another embodiment of the present invention.

Meanwhile, as shown in FIG. 4, in the case of the large-sized vehicle having a relatively short exhaust pipe 14, the preheating groove 132 can be formed in the spiral shape along the exhaust pipe 14.

In particular, in the winter season with cold outside air, the preheating part 130 prevents cold fuel of the fuel tank (not shown) from being directly introduced into the main heating part 110, so that the fuel can be uniformly heated even in the winter season.

INDUSTRIAL APPLICABILITY

Hereinafter, the assembling process and operation of the fuel heating equipment 100 of the diesel engine described above will be explained in brief.

First, the fuel supply pipe 140 extending from the fuel tank (not shown) is inserted along the preheating groove 132 formed in the exhaust pipe 14, and then the fuel supply pipe 140 is wound along the heating groove 114 formed in the collective tank 112.

After the fuel supply pipe 140 has been mounted closely to the exhaust pipe 14 and the collective tank 112, the upper part of the preheating groove 132, into which the fuel supply pipe 140 is inserted, is covered with the adiabatic cover 134. Similarly, the first heat conduction block 116a and the second heat conduction block 116b cover the upper part and the lower part of the collective tank 112, respectively, and adhere to each other. After that, in the case of the exhaust pipe 14, the fuel supply pipe 140 disposed along the exhaust pipe 14 is protected by the first and second preheating covers 136a and 136b. Similarly, in the case of the collective tank 112, the fuel supply pipe 140 wound around the collective tank 112, the first heat conduction block 116a and the second heat conduction block 116b are protected by the first and second heat insulation covers 120a and 120b. In this case, the adiabatic member 122 made from rock wool is filled between the first heat insulation cover 120a and the first heat conduction block 116a and between the second heat insulation cover 120b and the second heat conduction block 116b.

As described above, after the assembling process of the fuel heating equipment 100 according to the present invention has been completed, the engine 10 is operated. In this case, the exhaust heat exhausted from the engine 10 and having the high temperature is collected in the collective tank 112 through the first to fourth runners 12a to 12d, and then is discharged to the outside through the exhaust pipe 14. At this time, the collective tank 112 and the exhaust pipe 14 are heated at the high temperature by the exhaust heat.

If the exhaust pipe 14 and the collective tank 112 are heated, the fuel supply pipe 140 disposed along the exhaust pipe 14 and the collective tank 112 are heated by heat conducted from the exhaust pipe 14 and the collective tank 112. As the fuel supply pipe 140 has been heated, the fuel passing through the fuel supply pipe 140 is preheated in the preheating part 130 and is heated at the high temperature in the main heating part 110, and then the fuel is supplied to the engine 10.

The fuel heated at the high temperature is supplied to the engine 10, resulting in the complete combustion in the engine 10, enhancing the efficiency of the engine 10 and preventing sooty smoke from being produced.

Although few embodiments of the present invention have been shown and described, it would be appreciated by those skilled in the art that changes may be made in these embodiments without departing from the principles and sprit of the invention, the scope of which is defined in the claims and their equivalents.

The invention claimed is:

1. A fuel heating equipment of a diesel engine, comprising:
   a main heating part having a collective tank formed between a plurality of runners from the diesel engine and an exhaust pipe, the collective tank collecting heated exhaust gas from the plurality of runners; and
   a fuel supply pipe wound around the collective tank;
   wherein the collective tank has flat upper and lower parts,
   wherein the main heating part further includes first and second heat conduction blocks respectively in a contact with the upper and lower parts of the collective tank,
   wherein the fuel supply pipe is intervened between the first heat conduction block and the upper part of the collective tank and between the second heat conduction block and the lower part of the collective tank,
   wherein a heating groove is formed in an outer surface of the collective tank to receive the fuel supply pipe therein,
   wherein the main heating part further includes a first heat insulation cover and a second heat insulation cover to respectively cover the upper and lower parts of the collective tank, and
   wherein a rock wool is filled between the first heat conduction block and the first heat insulation cover and between the second heat conduction block and the second heat insulation cover.

* * * * *